US012637777B2

(12) United States Patent
Han et al.

(10) Patent No.: US 12,637,777 B2
(45) Date of Patent: May 26, 2026

(54) SYSTEM AND METHOD FOR ENHANCING PRODUCTION YIELD OF CO₂ CONVERSION PRODUCTS IN AN ELECTROCHEMICAL REACTOR USING AN OSMOTICALLY DRIVEN DEWATERING SYSTEM

(71) Applicant: HAMAD BIN KHALIFA UNIVERSITY, Doha (QA)

(72) Inventors: Dong Suk Han, Doha (QA); Sifani Zavahir, Doha (QA); Tasneem Elmakki, Doha (QA); Arti Mishra, Doha (QA); Izza Fatima, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 19/229,357

(22) Filed: Jun. 5, 2025

(65) Prior Publication Data

US 2025/0389032 A1 Dec. 25, 2025

Related U.S. Application Data

(60) Provisional application No. 63/662,902, filed on Jun. 21, 2024.

(51) Int. Cl.
*C25B 3/26* (2021.01)
*C02F 1/469* (2023.01)
(Continued)

(52) U.S. Cl.
CPC .............. *C25B 3/26* (2021.01); *C02F 1/4698* (2013.01); *C25B 3/07* (2021.01); *C25B 9/21* (2021.01);
(Continued)

(58) Field of Classification Search
None
See application file for complete search history.

(56) References Cited

U.S. PATENT DOCUMENTS 12,203,184 B2 * 1/2025 Simonetti ............ B01D 61/445

FOREIGN PATENT DOCUMENTS

WO WO-2024076233 A1 * 4/2024 ................ C08J 5/22

OTHER PUBLICATIONS

Kim, et al.; "High-Efficiency Solar Desalination Accompanying Electrocatalytic Conversions of Desalted Chloride and Captured Carbon Dioxide"; ACS Publications; vol. 7, Issue 18; Aug. 2019; (29 pages).

(Continued)

*Primary Examiner* — Wojciech Haske
(74) *Attorney, Agent, or Firm* — K&L Gates LLP

(57) ABSTRACT

A system and method are disclosed for increasing the production yield of CO₂ conversion products in an electrochemical reactor assisted by an osmotically driven dewatering system. The system comprises an electrochemical cell including a cathode chamber, an anode chamber, and a central desalination chamber. The cathode chamber includes a cathode active material, and the anode chamber includes an anode active material. The central desalination chamber comprises a plurality of desalination cells, each featuring alternating anion exchange membranes (AEMs) and cation exchange membranes (CEMs). A forward osmosis membrane (FOM) is integrated at the interface between the cathode chamber and the adjacent desalination cell, replacing the conventional terminal CEM. This configuration establishes an osmotic gradient that drives water flux from the cathode chamber into the desalination chamber, thereby (Continued)

concentrating the $CO_2$ conversion product (e.g., formate) in situ and enhancing Faradaic efficiency without requiring post-treatment.

20 Claims, 5 Drawing Sheets

(51) Int. Cl.

| | |
|---|---|
| *C25B 3/07* | (2021.01) |
| *C25B 9/21* | (2021.01) |
| *C25B 11/031* | (2021.01) |
| *C25B 11/061* | (2021.01) |
| *C25B 11/077* | (2021.01) |
| *C25B 13/08* | (2006.01) |
| *C02F 103/34* | (2006.01) |

(52) U.S. Cl.
CPC .......... *C25B 11/031* (2021.01); *C25B 11/061* (2021.01); *C25B 11/077* (2021.01); *C25B 13/08* (2013.01); *C02F 2103/34* (2013.01)

(56) References Cited

OTHER PUBLICATIONS

Goh, et al.; "Recent Progresses of Forward Osmosis Membranes Formulation and Design for Wastewater Treatment"; MDPI; vol. 11, Issue 10; Sep. 2019; (37 pages).

* cited by examiner

SYSTEM AND METHOD FOR ENHANCING PRODUCTION YIELD OF CO₂ CONVERSION PRODUCTS IN AN ELECTROCHEMICAL REACTOR USING AN OSMOTICALLY DRIVEN DEWATERING SYSTEM

CROSS-REFERENCE TO RELATED APPLICATIONS

The present application claims priority to and the benefit of U.S. Provisional Patent Application No. 63/662,902 filed Jun. 21, 2024, which is incorporated herein by reference in its entirety and relied upon.

BACKGROUND

The production and storage of hydrogen is crucial for achieving carbon neutrality, particularly when using hydrogen carriers like formic acid (formate), a prominent indirect hydrogen storage medium alongside ammonia. Formate can be produced through the electrochemical reduction of $CO_2$ in both liquid and gas phases. However, gas-phase conversion typically favors the formation of synthesis gas (CO+ $H_2$), resulting in low selectivity toward formate. Therefore, research has increasingly focused on the liquid-phase $CO_2$ reduction. The yield and selectivity of $CO_2$ conversion products are influenced by factors such as the choice of electrode materials and reaction duration. The kinetic profile of the system determines whether a single product (e.g., formate, acetic acid, oxalic acid) or a mixture of products is produced over time. Nonetheless, the overall Faradaic efficiency and scalability of this process remain limited due to the inherently low solubility of $CO_2$ in aqueous electrolytes and sluggish mass transport characteristics, which restrict in situ product concentration and commercial feasibility.

A need therefore exists for a method and system capable of increasing the in situ concentration and overall production yield of $CO_2$ conversion products without requiring energy-intensive post-treatment.

SUMMARY

Example systems, methods, and apparatus are disclosed herein for increasing the production yield of $CO_2$ conversion products in an electrochemical reactor through the integration of an osmotically driven dewatering mechanism.

In a first aspect of the present disclosure, combinable with any other aspect unless otherwise specified, a $CO_2$ conversion system using electrochemical desalination to increase the production of a $CO_2$ conversion product is provided. The system includes an electrochemical cell with a cathode chamber, an anode chamber, and a central desalination chamber. The cathode chamber includes a cathode active material. The anode chamber includes an anode active material. The central desalination chamber includes a plurality of desalination cells, including alternating anion exchange membranes (AEMs) and cation exchange membranes (CEMs). A forward osmosis membrane (FOM) is positioned at the interface between the cathode chamber and the first desalination cell, in place of a terminal cation exchange membrane (CEM), thereby creating an osmotic gradient during electrochemical desalination to facilitate water transfer from the cathode chamber into the desalination chamber and concentrate the $CO_2$ conversion product in situ.

In a second aspect of the present disclosure, which may be combined with any other aspect listed herein unless specified otherwise, the forward osmosis membrane (FOM) comprises a thin-film composite (TFC) membrane including a polyamide active layer.

In a third aspect of the present disclosure, which may be combined with any other aspect listed herein unless specified otherwise, the $CO_2$ conversion product includes one or more of formic acid, acetic acid, oxalic acid, and salts thereof.

In a fourth aspect of the present disclosure, which may be combined with any other aspect listed herein unless specified otherwise, the cathode active material includes CuO—$SnO_2$.

In a fifth aspect of the present disclosure, which may be combined with any other aspect listed herein unless specified otherwise, the anode active material includes platinum (Pt).

In a sixth aspect of the present disclosure, which may be combined with any other aspect listed herein unless specified otherwise, the $CO_2$ conversion product includes one or both of formic acid and formate.

In a seventh aspect of the present disclosure, which may be combined with any other aspect listed herein unless specified otherwise, the cathode active material is deposited on a nickel (Ni) foam substrate.

In an eighth aspect of the present disclosure, which may be combined with any other aspect listed herein unless specified otherwise, the cathode chamber is configured to receive a continuous feed of $CO_2$ gas for conversion.

In a ninth aspect of the present disclosure, which may be combined with any other aspect listed herein unless specified otherwise, the $CO_2$ gas is a waste product from an industrial process.

In a tenth aspect of the present disclosure, which may be combined with any other aspect listed herein unless specified otherwise, the central desalination chamber is configured to receive a water source for desalination.

In an eleventh aspect of the present disclosure, which may be combined with any other aspect listed herein unless specified otherwise, the water source is saline (e.g., brine) wastewater from an industrial process.

In a twelfth aspect of the present disclosure, which may be combined with any other aspect listed herein unless specified otherwise, a method is provided for increasing the production yield of a $CO_2$ conversion product using electrochemical desalination. The method includes providing a $CO_2$ conversion system comprising an electrochemical cell with a cathode chamber, an anode chamber, and a central desalination chamber. The cathode chamber includes a cathode active material, and the anode chamber includes an anode active material. The central desalination chamber includes a plurality of desalination cells formed by alternating anion exchange membranes (AEMs) and cation exchange membranes (CEMs). A forward osmosis membrane (FOM) is integrated at the interface between the cathode chamber and the first desalination cell, replacing the terminal cation exchange membrane, thereby enhancing the osmotic gradient during electrochemical desalination. The method further includes feeding $CO_2$ gas into the cathode chamber and introducing saline water into the desalination chamber, such that the $CO_2$ conversion product is electrochemically generated in the cathode chamber while the saline water undergoes desalination concurrently in the central desalination chamber.

In a thirteenth aspect of the present disclosure, which may be combined with any other aspect listed herein unless specified otherwise, the $CO_2$ conversion product includes one or more of formic acid, acetic acid, oxalic acid, and salts thereof.

In a fourteenth aspect of the present disclosure, which may be combined with any other aspect listed herein unless specified otherwise, the cathode active material includes $CuO—SnO_2$.

In a fifteenth aspect of the present disclosure, which may be combined with any other aspect listed herein unless specified otherwise, the anode active material includes platinum (Pt).

In a sixteenth aspect of the present disclosure, which may be combined with any other aspect listed herein unless specified otherwise, the $CO_2$ conversion product of the method includes one or both of formic acid and formate.

In a seventeenth aspect of the present disclosure, which may be combined with any other aspect listed herein unless specified otherwise, the cathode active material is deposited on a nickel (Ni) foam substrate.

In an eighteenth aspect of the present disclosure, which may be combined with any other aspect listed herein unless specified otherwise, the $CO_2$ gas of the method is a waste product from an industrial process.

In a nineteenth aspect of the present disclosure, which may be combined with any other aspect listed herein unless specified otherwise, the water source of the method is a saline (e.g., brine) wastewater source from an industrial process.

In a twentieth aspect of the present disclosure, which may be combined with any other aspect listed herein unless specified otherwise, the forward osmosis membrane (FOM) of the method comprises a thin-film composite (TFC) membrane including a polyamide active layer.

An advantage of the present disclosure is to provide an electrochemical reactor integrated with an osmotically driven dewatering system, which enhances the in situ concentration and yield of $CO_2$ conversion products, according to an embodiment. This system design eliminates the need for energy- or solvent-intensive post-treatment steps and enhances Faradaic efficiency by controlling water migration across a forward osmosis membrane (FOM) at the cathode interface.

Additional features and advantages are described in, and will be apparent from, the following detailed description. The features and advantages described herein are not all-inclusive and, in particular, many additional features and advantages will be apparent to those skilled in the art based on the accompanying figures and description. In addition, any particular embodiment does not have to have all of the advantages listed herein, and it is expressly contemplated to claim individual advantageous embodiments separately. Moreover, it should be noted that the terminology used in the specification has been selected principally for readability and instructional purposes, and not to limit the scope of the claimed inventive subject matter.

DETAILED DESCRIPTION

Figure 1:
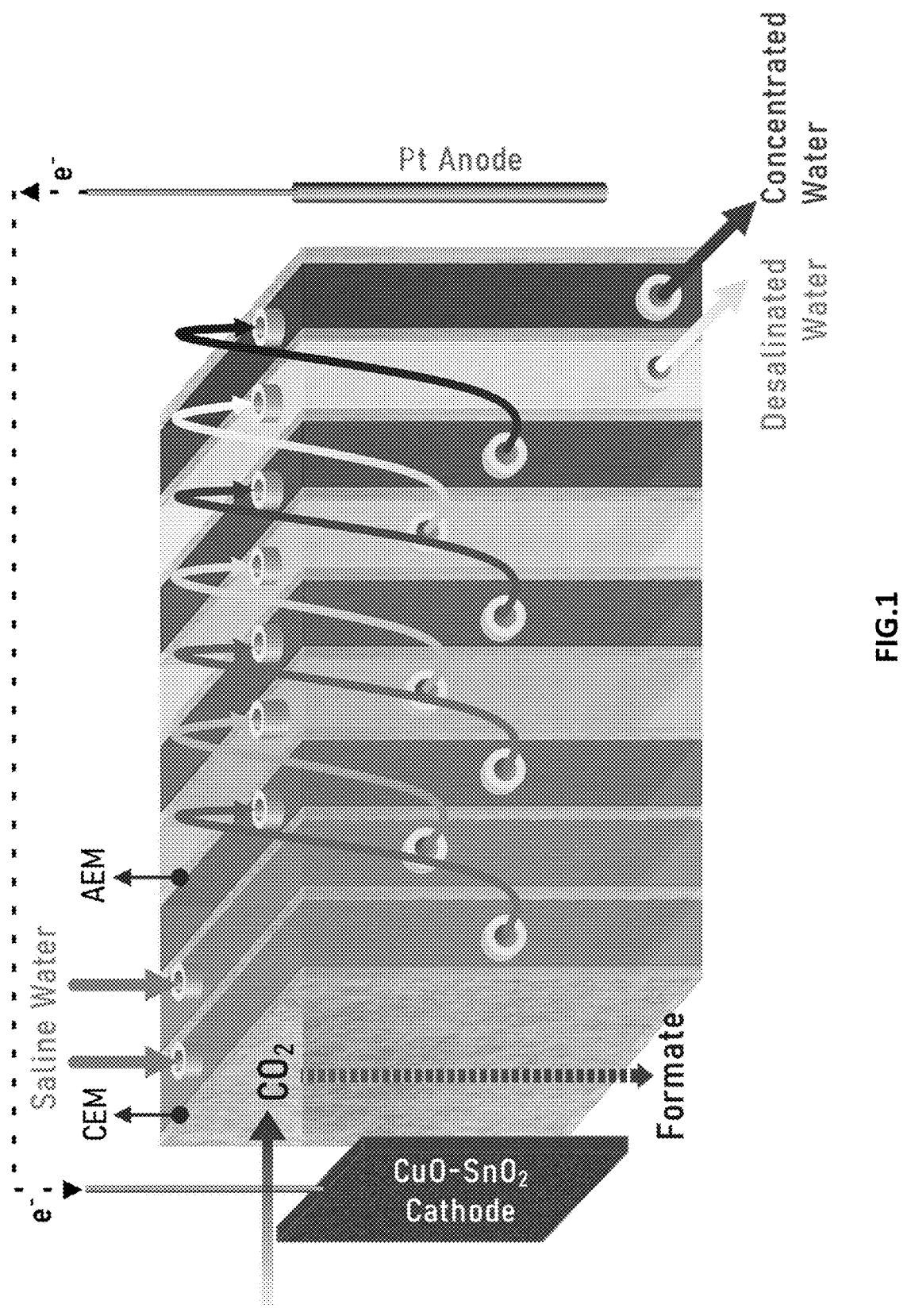
FIG. 1 shows a schematic diagram of an electrochemical $CO_2$ conversion and desalination system serving as a reference cell for formate production. The system includes a $CuO—SnO_2$ cathode, a platinum (Pt) anode, and a central desalination chamber composed of multiple desalination cells separated by ion exchange membranes, such as cation exchange membranes (CEMs) and anion exchange membranes (AEMs), arranged in an alternating sequence. This configuration represents the baseline design without a forward osmosis membrane (FOM).

The present technology generally relates to a system and method for increasing the production yield of $CO_2$ conversion products in an electrochemical reactor, assisted by an osmotically driven dewatering mechanism. The present technology is described in further detail below, with reference to example embodiments illustrated in the accompanying figures.

In an embodiment, the system comprises an electrochemical $CO_2$ conversion cell featuring a cathode chamber, an anode chamber, and a central desalination chamber. The cathode chamber contains a cathode active material; the anode chamber contains an anode active material. The central desalination chamber includes a plurality of desalination cells formed by alternating anion exchange membranes (AEMs) and cation exchange membranes (CEMs). In the improved configuration, a forward osmosis membrane (FOM) is strategically positioned at the interface between the cathode chamber and the first desalination cell, replacing the terminal CEM typically found in conventional designs. This modification creates a favorable osmotic gradient that drives water from the cathode chamber into the desalination chamber, thereby concentrating the $CO_2$ reduction product within the cathode chamber and significantly enhancing Faradaic efficiency.

The present technology can be applied to a wide range of industrial processes, including but not limited to gas processing, oil refining, and the petrochemical sector. It utilizes available waste streams such as $CO_2$ gas and brine water to increase the production yield of $CO_2$ conversion products. By integrating an osmotically driven FOM-assisted dewatering mechanism into an electrochemical reactor, the system enables the in situ enrichment of products such as formic acid, acetic acid, oxalic acid, and their respective salts. Notably, this is achieved without the need for additional energy-intensive post-treatment, supporting its scalability and commercial viability.

The present technology also enables the practical use of electrocatalysts that may offer limited electrochemical performance but possess advantageous properties such as high selectivity, durability, eco-friendliness, ease of preparation and maintenance, and resistance to corrosion and wear, in commercial-scale electrocatalytic systems according to an embodiment. One of the core innovations is the design's compatibility with existing industrial infrastructure, which enables scalability and eliminates the need for specialized labor. It addresses the challenge of low product yield from poor-performing catalysts by improving the conversion process itself, removing the need for research that focuses more on new material development.

Electrochemical $CO_2$ conversion systems that integrate a central desalination chamber for simultaneous $CO_2$ reduction and water desalination already exist. These conventional systems employ desalination cell stacks composed of alternating CEMs and AEMs. However, the novel configuration described herein, featuring a forward osmosis membrane (FOM) placed at the cathode-desalination interface, offers a major enhancement by enabling in situ product enrichment. This enables the use of durable, selective, and industrially robust catalysts under ambient temperature and pressure conditions. As a result, the present system and method eliminate the need for post-processing steps such as vacuum concentration or solvent extraction, thereby offering a more energy- and cost-efficient path to product yield enhancement.

The specialized electrochemical test cell incorporating a central desalination chamber is custom-built for the present technology. The integration of this chamber with an FOM at the interface between the cathode chamber and the first desalination cell represents a novel configuration that has not been previously described. Furthermore, the hybrid architecture can be scaled up using principles derived from modular system component design.

The present system enhances electrochemical $CO_2$ reduction by replacing the terminal CEM adjacent to the cathode with an FOM. This replacement occurs in a multi-stacked electrochemical reactor that incorporates alternating layers of AEMs and CEMs in the central desalination chamber. This configuration demonstrates a doubling of formic acid concentration in comparative experiments (see Table 1), alongside a significant improvement in Faradaic efficiency (FE). While validated with formic acid, this approach is extendable to other $CO_2$ reduction products such as acetic acid, oxalic acid, and respective salts thereof. For example, in a typical system where both formic and oxalic acids are generated over a 6-hour period, with formic acid yield plateauing after 1.5 hours at 30% FE, the FOM-based approach can effectively double the FE of formic acid over the same duration. Therefore, this strategy enables the selective enhancement of target product yields in mixed-product systems.

In applications targeting a single $CO_2$ conversion product, this system reduces overall energy consumption. For instance, in a system producing oxalic acid with an 80% FE after 6 hours and a 50% FE after 2 hours, the FOM-integrated setup can achieve a FE of greater than 90% within 2 hours. Since reaction duration correlates directly with energy consumption, this efficiency gain translates to reduced power demand, enhancing the overall sustainability of the process.

Although demonstrated with formate in Table 1, the platform is compatible with diverse catalytic systems, including Cu—Sn and Bi-based catalysts, to facilitate the selective isolation of a single product from multi-product $CO_2$ electroreduction reactions.

The introduction of a FOM between the cathode chamber and the first desalination cell establishes an effective osmotic gradient. This gradient induces water movement from the lower-salinity cathode chamber to the higher-salinity desalination chamber. The process follows the principles of osmotically driven desalination, where water molecules naturally migrate from a less saline feed solution to a more saline draw solution. As a result, the water volume in the cathode chamber (feed solution side) decreases, while the volume in the first desalination cell (draw solution side) increases. This osmotic process effectively concentrates the product in the cathode chamber, reducing the electrolyte volume and eliminating the need for expensive post-treatment steps typically required for product concentration in the electrochemical $CO_2$ conversion process.

Moreover, the present system operates efficiently under ambient temperature and pressure without relying on additional reactors, expensive noble metal electrodes, or complex system designs. Its simplicity and adaptability make it attractive for integration into a wide range of electrochemical applications requiring improved product selectivity and yield.

A primary aspect of the present technology involves enhancing the efficiency of the electrochemical $CO_2$ conversion system, which is crucial for the synthesis of reactive intermediates and stable chemicals. The present technology aims to enhance product efficiency by optimizing the FE of $CO_2$ conversion products, such as formate or other organic compounds, thereby mirroring the benefits of artificial photosynthesis and aligning with market demands. Typically, electrochemical processes involve reduction at the cathode and oxidation at the anode. In an undivided cell, mixing of products generated at the cathode (e.g., formate) and at the anode (e.g., oxygen or chlorine) can occur, potentially resulting in the formation of unwanted byproducts.

To enhance product yields, previous systems incorporated a central desalination chamber flanked by ion exchange membranes (e.g., AEM and CEM) in an alternating arrangement. These systems were configured to operate under applied electrical bias, where cations migrate through the CEMs toward the cathode and anions through the AEMs toward the anode. This enables the removal of salt ions from saline feedwater in a flow-through setup. However, while desalination was achieved, the formate concentration in the cathode chamber remained low, often necessitating post-treatment steps, such as solvent extraction or vacuum concentration for product enrichment.

The present technology overcomes this limitation by replacing the CEM at the interface between the cathode chamber and the first desalination cell with an FOM. This configuration enables osmotic water extraction from the cathode chamber into the more saline desalination chamber, concentrating the desired product in situ and eliminating the need for downstream processing.

The present technology, in an embodiment, utilizes a cathode composed of CuO—SnO$_2$ deposited onto a nickel (Ni) foam substrate, which is both highly pure and easy to prepare, according to an embodiment. While CuO—SnO$_2$ exhibits modest efficiency in electrochemical $CO_2$ conversion to formate, the present innovation compensates for this by concentrating the product during operation. The system is designed to maximize both conversion and enrichment, as demonstrated in the figures described below.

Figure 2:
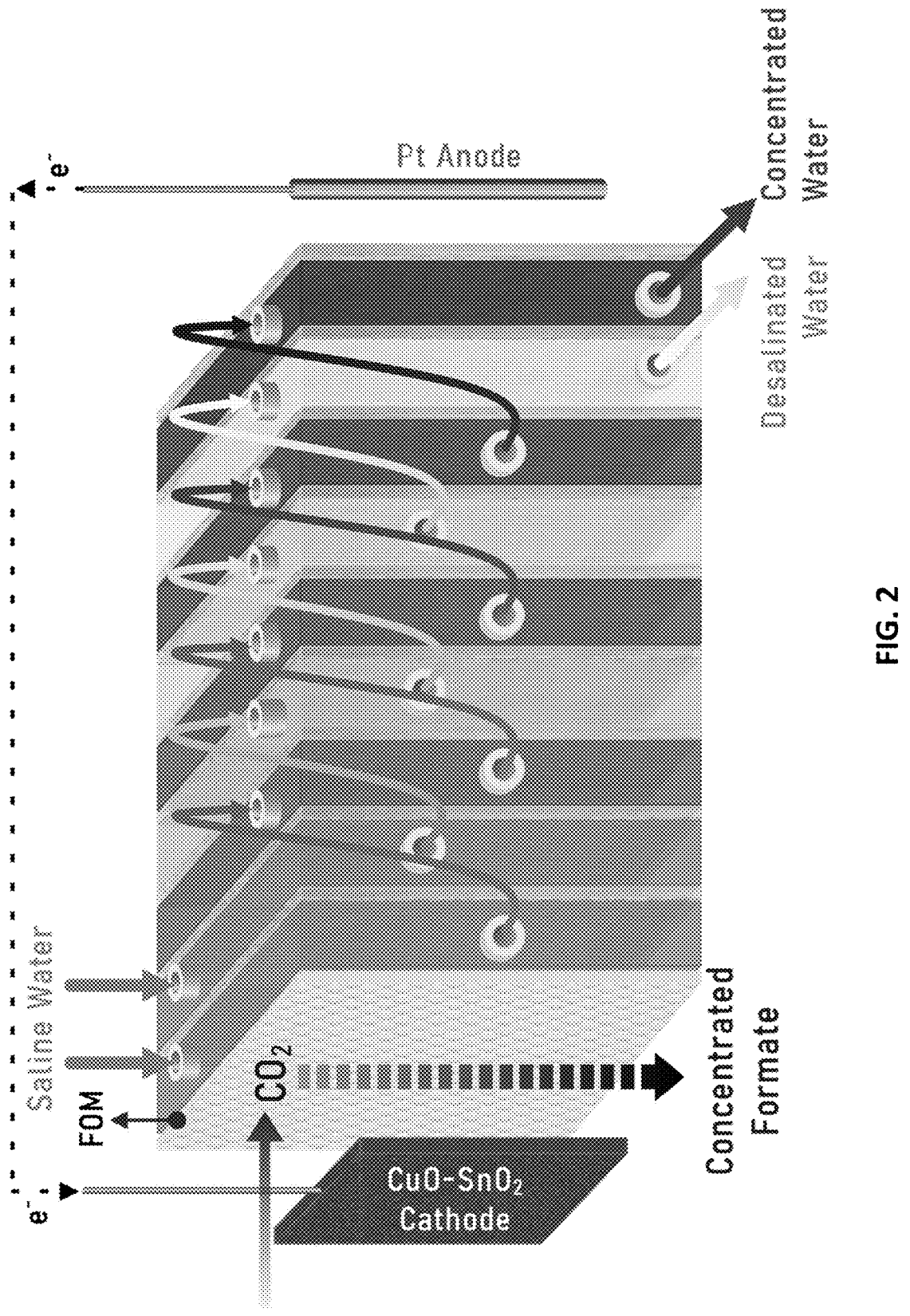
FIG. 2 shows a schematic of an improved electrochemical system assembly incorporating a forward osmosis membrane (FOM) at the interface between the cathode chamber and the first desalination cell, replacing the terminal CEM used in FIG. 1. This FOM-enabled configuration enhances osmotic water transport, enabling in situ formate concentration in the cathode chamber. The system includes a $CuO—SnO_2$ cathode, a Pt anode, and a series of desalination cells separated by alternating AEMs and CEMs.

FIG. 1 shows a baseline configuration where the cathode and anode chambers are separated by a central desalination chamber comprising alternating CEMs and AEMs, whereas FIG. 2 illustrates an improved version of this configuration. In the improved system, the terminal CEM between the cathode chamber and the adjacent set of desalination cells is replaced with an FOM. Additionally, the catholyte is formulated to have a lower ionic concentration than the saline influent introduced into the desalination cell next to the cathode chamber. This concentration gradient establishes a favorable osmotic gradient across the FOM, where the lower osmolarity catholyte acts as a feed solution and the high-salinity influent serves as a draw solution, thereby driving water flux from the cathode chamber into the desalination chamber. As a result, the catholyte volume decreases, leading to in situ concentration (enrichment) of the electrochemical $CO_2$ conversion product, such as formate (or formic acid), within the cathode chamber.

FIG. 1 illustrates the architecture of a reference electrochemical system for simultaneous $CO_2$ capture, water desalination, and formate production. The system includes a cathode chamber and an anode chamber, spatially separated by a central desalination chamber including multiple desalination cells. These desalination cells are arranged in a stacked configuration using alternating CEMs and AEMs. The cathode chamber includes a cathode (working) electrode composed of $CuO$—$SnO_2$ active material deposited on a nickel (Ni) foam substrate. The electrode is prepared by drop-casting a slurry of $CuO$—$SnO_2$, acetylene carbon, and polyvinylidene fluoride (PVDF) binder in an 80:10:10 weight ratio. The cathode chamber also contains a reference electrode and a catholyte solution, and is continuously purged with $CO_2$ gas during operation to enable electrochemical reduction. The anode chamber houses a counter electrode and an anolyte solution. The central desalination chamber contains desalination cells with alternating layers of CEMs and AEMs, beginning with a CEM positioned directly at the interface between the cathode chamber and the first desalination cell. Under an applied electrical potential, ionic migration across the ion-exchange membranes enables selective removal of cations and anions from saline feedwater, resulting in desalinated water near the anode side. Post-reaction analysis of catholyte samples using high-performance liquid chromatography (HPLC) confirms the production of formic acid as the primary $CO_2$ reduction product.

In an illustrative embodiment, the system comprises a cathode, an anode, and a central desalination chamber, all of which are housed within a three-dimensional geometric structure. The structure may take the form of a rectangular prism or a cube.

FIG. 2 presents an enhanced architecture of the electrochemical water desalination and formate production system, featuring a FOM strategically integrated into the desalination cell assembly, according to one embodiment. This system comprises a cathode chamber and an anode chamber arranged in parallel, separated by a central desalination chamber composed of multiple desalination cells. These cells are separated by alternating CEMs and AEMs.

The cathode chamber includes a cathode (working) electrode composed of $CuO$—$SnO_2$ active material deposited on a Ni foam substrate, a reference electrode, and a catholyte solution. $CO_2$ gas is continuously purged into the cathode chamber during electrochemical operation. The anode chamber contains the counter electrode and anolyte solution. The desalination chamber comprises multiple stacked cells in an alternating CEM-AEM arrangement. The regulated movement of cations and anions through these membranes facilitates desalination, resulting in the recovery of desalinated water near the anode side.

In this modified configuration, the terminal CEM in the baseline architecture (FIG. 1), located between the cathode chamber and the adjacent desalination cell, is replaced with an FOM. This FOM enables the osmotic water transfer from the lower-salinity catholyte to the higher-salinity feedwater in the desalination cell. The resulting osmotic flux decreases the catholyte volume, concentrating the electrochemical $CO_2$ reduction product, such as formate (or formic acid), within the cathode chamber. This enrichment process occurs under ambient temperature and pressure conditions, eliminating the need for downstream concentration steps such as distillation or solvent extraction. Post-operation analysis of catholyte aliquots using HPLC confirms both the production and in situ enrichment of formic acid in this innovative setup. The system's product selectivity and efficiency are quantified using Faradaic efficiency, as outlined in Equation 1.

$$\text{Faradaic efficiency (\%)} = \qquad \text{(Eq. 1)}$$
$$\frac{\text{number of moles of electrons stored in formate} * 100\%}{\textit{no}. \text{ of moles of electrons generated in the system}}$$

Table 1 presents a comparative performance analysis of the electrochemical $CO_2$ conversion system with and without FOM integration. The system configurations, one incorporating a conventional CEM (FIG. 1) and the other using a FOM (FIG. 2), are evaluated based on formate production and Faradaic efficiency.

| Entry | Electrode | [KBC], mM | [NaCl], mM | Desalination cells | Time, hr | $[FA]_{CEM}$/ $\mu mol L^{-1}$ | $[FA]_{FOM}$/ $\mu mol L^{-1}$ |
|---|---|---|---|---|---|---|---|
| 1 | $CuO$—$SnO_2$ | 2 | 600 | 8 | 3 | 5 | 383 |
| 2 | $CuO$—$SnO_2$ | 100 | 600 | 8 | 3 | 610 | 1037 |
| 3 | $CuO$—$SnO_2$ | 200 | 600 | 8 | 3 | 1417 | 2786 |
| 4 | $CuO$—$SnO_2$ | 300 | 600 | 8 | 3 | 2224 | 4536 |
| 5 | $CuO$—$SnO_2$ | 300 | 600 | 6 | 3 | 860 | 1565 |
| 6 | $CuO$—$SnO_2$ | 300 | 600 | 10 | 3 | 3587 | 6995 |

Figure 3:
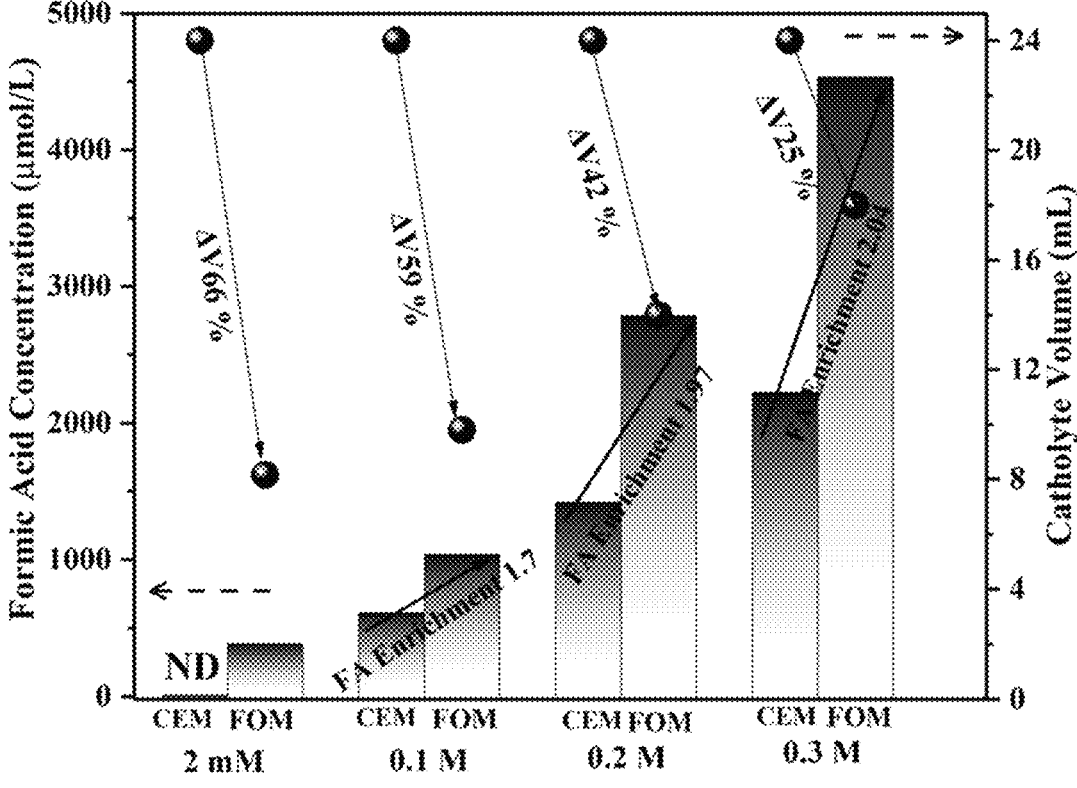
FIG. 3 presents a comprehensive graph showing the concentration of formate produced using the improved FOM-integrated system (FIG. 2) versus the CEM-based reference system (FIG. 1) under different catholyte concentrations. The central desalination chamber is fed with a water source containing 0.6 M NaCl.
Figure 4:
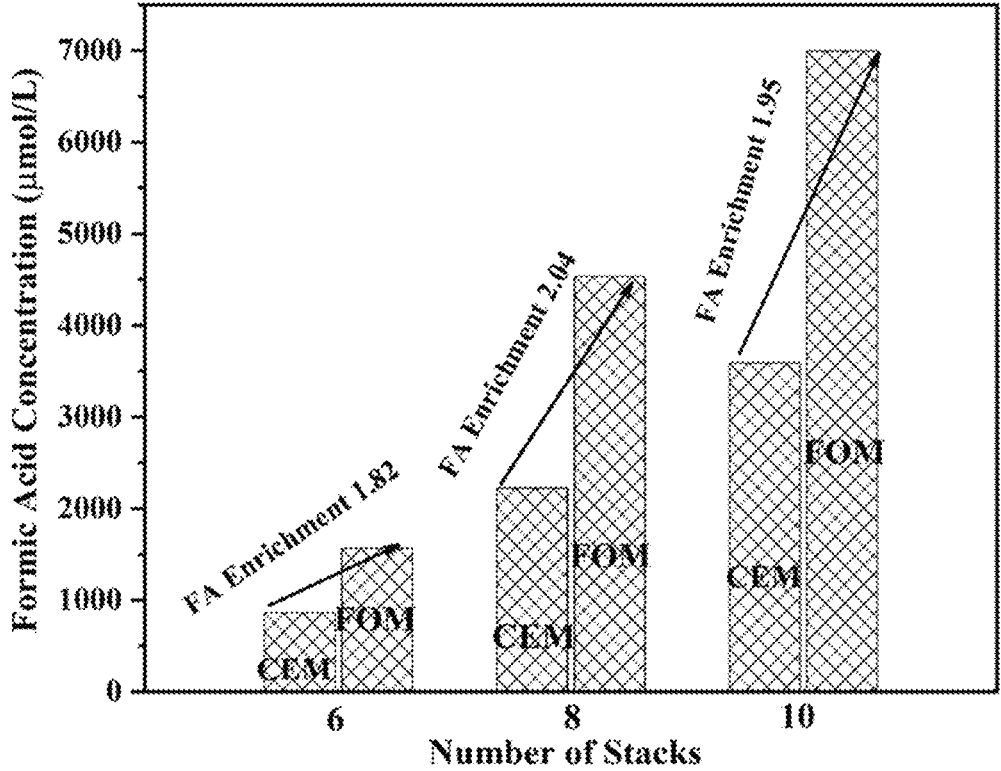
FIG. 4 presents a graph comparing formate production and concentration in systems using FOM- and CEM-based desalination assemblies (as depicted in FIG. 2 and FIG. 1, respectively), with different numbers of desalination cell pairs. The catholyte includes 0.3 M potassium bicarbonate (KBC), and the desalination chamber is supplied with a 0.6 M NaCl solution to simulate saline wastewater (e.g., brine).

As illustrated in FIGS. 3 and 4, electrochemical measurements were performed using a Gamry electrochemical workstation (Reference 3000, Gamry Co., USA). A three-electrode configuration was employed, consisting of a saturated calomel electrode (SCE) as a reference electrode, a platinum (Pt) wire as the counter electrode, and a synthesized $CuO$—$SnO_2$-based working electrode. The working electrode was prepared from a composite containing $CuO$—$SnO_2$ (80 wt %), acetylene carbon (10 wt %), and polyvinylidene fluoride (PVDF) binder (10 wt %), dispersed in N-methyl-2-pyrrolidone (NMP). The resulting slurry was sonicated for one hour, aged for one day, and then sonicated again for one hour immediately before being drop-cast onto Ni foam substrate (2 cm×3 cm). The electrodes were dried at 65° C. for 5 hours. All electrodes were prepared using the same loading and precursor ratios to ensure consistency. The number of desalination cells in the system was varied among 6, 8, and 10. Electrochemical measurements were performed in $KHCO_3$ catholyte/anolyte solutions with varying concentrations (2 mM, 100 mM, and 300 mM), while a 0.6 M NaCl aqueous solution was circulated through the desalination chamber at a constant flow rate of 2 mL/min.

Figure 5:
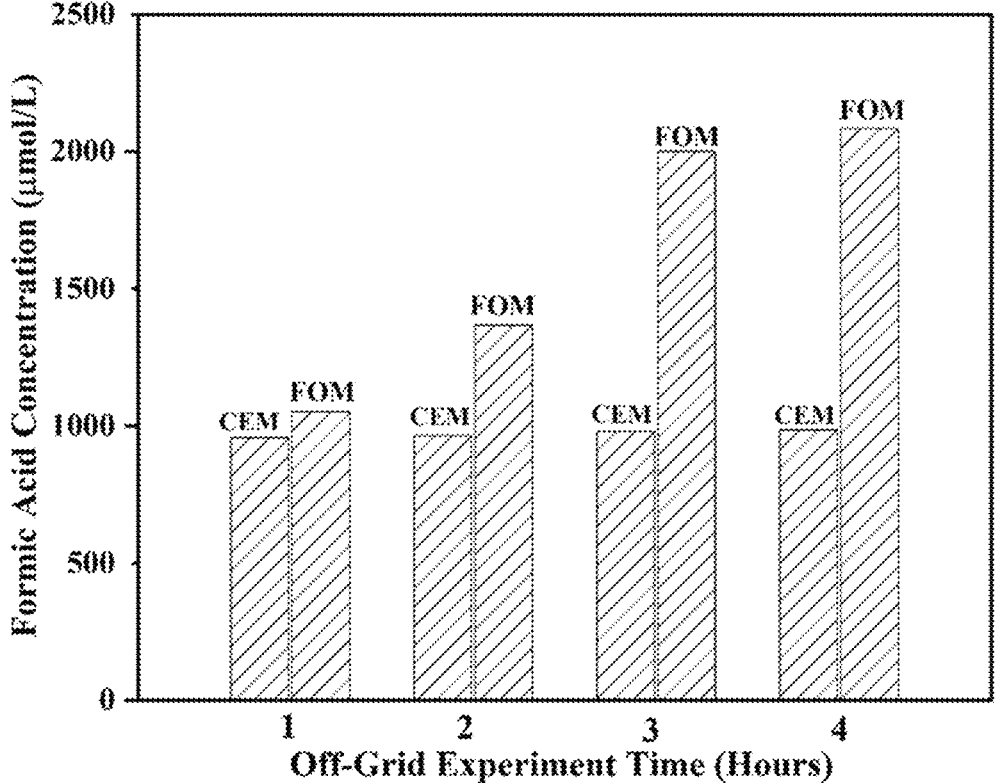
FIG. 5 presents a graph illustrating a variation of formate concentration over time for two parallel $CO_2$ conversion systems operated in off-grid mode. One system utilizes the baseline CEM-based desalination assembly (FIG. 1). The FOM system exhibits a time-dependent enrichment of formate concentration in the absence of an applied external bias.

As further illustrated in FIG. 5, a separate experiment was conducted by preloading the catholyte chamber with 1000 $\mu mol\ L^{-1}$ of formate, and the system was operated in an unbiased (no applied voltage), off-grid mode. FA concentration measurements over time, presented in Table 2, demonstrate that the FOM-based desalination cell assembly (FIG. 2) enables continuous enrichment of formate in the cathode chamber. In contrast, the CEM-based configuration (FIG. 1) exhibits a negligible change in FA concentration under the same conditions. These results confirm that the present technology enables in situ product enrichment via osmotic water removal, specifically in FOM-integrated systems, thereby eliminating the need for downstream post-treatment steps to enhance product yield.

TABLE 2

Time-dependent formate concentration in parallel electrochemical $CO_2$ conversion systems: One equipped with a CEM-based desalination cell assembly (FIG. 1) and the other with a FOM-based desalination cell assembly (FIG. 2).

| Entry | Electrode | [KBC], mM | [NaCl], mM | Desalination cells | Time, hrc | $[FA]_{CEM}$/ $\mu molL^{-1}$ | $[FA]_{FOM}$/ $\mu molL^{-1}$ |
|---|---|---|---|---|---|---|---|
| 1 | $CuO—SnO_2$ | 300 | 600 | 8 | 1 | 958 | 1052 |
| 2 | $CuO—SnO_2$ | 300 | 600 | 8 | 2 | 964 | 1368 |
| 3 | $CuO—SnO_2$ | 300 | 600 | 8 | 3 | 980 | 2000 |
| 4 | $CuO—SnO_2$ | 300 | 600 | 8 | 4 | 986 | 2084 |

The disclosed configurations enable the application of catalysts that, while exhibiting only moderate conversion rates, offer substantial advantages, such as high product selectivity, long-term durability, and operational stability. These catalysts can be readily synthesized from earth-abundant and cost-effective raw materials using straightforward preparation methods, making them suitable for commercial or industrial-scale manufacturing systems. The improved system configuration significantly enhances the in situ conversion efficiency of such catalysts, thereby eliminating the need for external post-treatment steps. Moreover, the system can be adapted for the concentration (enrichment) of products in either cathodic or anodic processes by appropriately adjusting the composition of solution streams introduced into the central desalination chamber, relative to the catholyte or anolyte.

Additionally, the present technology is amenable to further integration. For example, the electrochemical system with a concurrent desalination unit equipped with an FOM, as described herein, can be coupled with a solar photovoltaic (PV) system, thereby enabling energy-autonomous, off-grid operation and enhancing the overall sustainability of the process.

It should be understood that various modifications and adaptations to the preferred embodiments described herein will be apparent to those skilled in the art. Such changes can be made without departing from the spirit and scope of the present subject matter or compromising its intended advantages. It is therefore intended that the appended claims cover all such changes and modifications.

The invention is claimed as follows:

1. A $CO_2$ conversion system using electrochemical desalination to increase the production of a $CO_2$ conversion product, the system comprising:
   an electrochemical cell including a cathode chamber, an anode chamber, and a central desalination chamber,
   wherein the cathode chamber includes a cathode active material,
   wherein the anode chamber includes an anode active material,
   wherein the central desalination chamber includes a plurality of desalination cells, including alternating anion exchange membranes (AEMs) and cation exchange membranes (CEMs), and
   wherein a forward osmosis membrane (FOM) is positioned at an interface between the cathode chamber and a first desalination cell of the plurality of desalination cells, in place of a terminal cation exchange membrane, thereby creating an osmotic gradient during electrochemical desalination to facilitate water transfer from the cathode chamber into the desalination chamber and concentrate the $CO_2$ conversion product in situ.

2. The system according to claim 1, wherein the forward osmosis membrane (FOM) comprises a thin-film composite (TFC) membrane including a polyamide active layer.

3. The system according to claim 1, wherein the $CO_2$ conversion product includes one or more of formic acid, acetic acid, oxalic acid, and salts thereof.

4. The system according to claim 1, wherein the cathode active material includes $CuO—SnO_2$.

5. The system according to claim 4, wherein the anode active material includes platinum (Pt).

6. The system according to claim 5, wherein the $CO_2$ conversion product includes one or both of formic acid and formate.

7. The system according to claim 6, wherein the cathode active material is deposited on a nickel (Ni) foam substrate.

8. The system according to claim 1, wherein the cathode chamber is configured to receive a continuous feed of $CO_2$ gas for conversion.

9. The system according to claim 8, wherein the $CO_2$ gas is a waste product from an industrial process.

10. The system according to claim 1, wherein the central desalination chamber is configured to receive a water source for desalination.

11. The system according to claim 10, wherein the water source is saline wastewater from an industrial process.

12. A method for increasing the production of a $CO_2$ conversion product using electrochemical desalination, the method comprising:

provide a $CO_2$ conversion system comprising an electrochemical cell including a cathode chamber, an anode chamber, and a central desalination chamber, wherein the cathode chamber includes a cathode active material, wherein the anode chamber includes an anode active material, wherein the central desalination chamber includes a plurality of desalination cells including alternating anion exchange membranes (AEMs) and cation exchange membranes (CEMs), and wherein a forward osmosis membrane (FOM) is integrated at an interface between the cathode chamber and a first desalination cell of the plurality of desalination cells, in place of a terminal cation exchange membrane, thereby enhancing an osmotic gradient during electrochemical desalination;

feeding $CO_2$ gas into the cathode chamber;

feeding saline water to the desalination chamber; and producing the $CO_2$ conversion product via electrochemical conversion in the cathode chamber while concurrently desalinating the saline water in the central desalination chamber.

13. The method according to claim 12, wherein the $CO_2$ conversion product includes one or more of formic acid, acetic acid, oxalic acid, and salts thereof.

14. The method according to claim 12, wherein the cathode active material includes $CuO$—$SnO_2$.

15. The method according to claim 14, wherein the anode active material includes platinum (Pt).

16. The method according to claim 15, wherein the $CO_2$ conversion product includes one or both of formic acid and formate.

17. The method according to claim 16, wherein the cathode active material is deposited on a nickel (Ni) foam substrate.

18. The method according to claim 12, wherein the $CO_2$ gas is a waste product from an industrial process.

19. The method according to claim 12, wherein the water source is a saline wastewater source from an industrial process.

20. The method according to claim 12, wherein the forward osmosis membrane (FOM) comprises a thin-film composite (TFC) membrane including a polyamide active layer.

*  *  *  *  *